United States Patent [19]

Murphy et al.

[11] Patent Number: 5,799,082
[45] Date of Patent: Aug. 25, 1998

[54] SECURE AUTHENTICATION OF IMAGES

[75] Inventors: Michael D. Murphy, Sunnyvale; James M. Janky, Los Altos; John F. Schipper, Palo Alto, all of Calif.

[73] Assignee: Trimble Navigation Limited, Sunnyvale, Calif.

[21] Appl. No.: 554,820

[22] Filed: Nov. 7, 1995

[51] Int. Cl.⁶ ............................. H04L 9/00; H04K 1/00
[52] U.S. Cl. ........................ 380/7; 380/10; 380/23; 380/25
[58] Field of Search .................... 380/4, 7, 25, 23, 380/10; 364/449.01, 449.7, 449.9

[56] References Cited

U.S. PATENT DOCUMENTS

| | | | |
|---|---|---|---|
| 3,798,360 | 3/1974 | Feistel | 178/22 |
| 3,872,483 | 3/1975 | Numata | 354/53 |
| 3,882,512 | 5/1975 | Laurance | 354/109 |
| 3,968,505 | 7/1976 | Kauneckas | 354/106 |
| 4,053,240 | 10/1977 | Aizawa | 356/4 |
| 4,064,515 | 12/1977 | Mashimo | 354/23 |
| 4,074,324 | 2/1978 | Barrett | 358/296 |
| 4,122,521 | 10/1978 | Rick | 364/424 |
| 4,131,919 | 12/1978 | Lloyd | 360/9 |
| 4,149,795 | 4/1979 | Sakurada | 354/23 |
| 4,175,848 | 11/1979 | Murakami | 354/289 |
| 4,361,388 | 11/1982 | Mlcak | 354/106 |
| 4,405,829 | 9/1983 | Rivest | 178/22.1 |
| 4,418,425 | 11/1983 | Fennel | 455/27 |
| 4,489,351 | 12/1984 | de Costamore d'Arc | 358/213 |
| 4,541,010 | 9/1985 | Alston | 358/44 |
| 4,626,898 | 12/1986 | Baba et al. | 358/48 |
| 4,635,203 | 1/1987 | Merchant | 364/458 |
| 4,680,628 | 7/1987 | Wojcik | 358/111 |
| 4,695,959 | 9/1987 | Lees | 364/458 |
| 4,702,585 | 10/1987 | Harada et al. | 354/410 |
| 4,704,632 | 11/1987 | Van Den Heuvel | 358/209 |
| 4,709,266 | 11/1987 | Hanas | 380/20 |
| 4,791,589 | 12/1988 | Blazo et al. | 364/518 |
| 4,837,628 | 6/1989 | Sasaki | 358/209 |
| 4,860,352 | 8/1989 | Laurance et al. | 380/23 |
| 4,864,616 | 9/1989 | Pond et al. | 380/25 |
| 4,887,296 | 12/1989 | Horne | 380/21 |
| 4,916,737 | 4/1990 | Chomet | 380/20 |
| 4,993,067 | 2/1991 | Leopold | 380/21 |
| 5,045,937 | 9/1991 | Myrick | 358/109 |
| 5,115,467 | 5/1992 | Esserman | 380/44 |
| 5,191,613 | 3/1993 | Graziano | 380/25 |

(List continued on next page.)

OTHER PUBLICATIONS

S. Walton, "Image Authentication for a Slippery New Age", Dr. Dobb's Journal, Apr. 1995, pp. 18–26.
GPS Interface Control Document ICD-GPS-200, Rockwell Intl. Corp., Satellite Systems Div., Rev. B-PR, Jul. 3, 1991.

Primary Examiner—Thomas H. Tarcza
Assistant Examiner—Carmen D. White
Attorney, Agent, or Firm—Wagner, Murabito & Hao

[57] ABSTRACT

Apparatus for capturing and authenticating a visual image of a selected view, using a digital image forming means, such as a digital camera, together with a position determining system that provides position information, including location, angular orientation and/or time of observation at the time a digital image is formed by the digital camera. Once captured, the visual or electronic image and accompanying position information cannot be deleted or altered within the digital camera and can be downloaded only by an authorized downloader. The digital image of the selected view is presented as an array of pixels with associated pixel values. The position information may be incorporated in the digital image by altering selected pixel bit values for a selected pattern of pixels in the pixel array, or as any other suitable overlay; and this selected pattern may be determined using the position information. The position information may be encrypted, using an encryption key based on position information, and may be stored as part of the digital image. Optionally, position information includes the distance from the digital camera to a selected object in the selected view.

19 Claims, 8 Drawing Sheets

U.S. PATENT DOCUMENTS

| | | | |
|---|---|---|---|
| 5,221,925 | 6/1993 | Cross | 340/988 |
| 5,237,612 | 8/1993 | Raith | 380/23 |
| 5,243,652 | 9/1993 | Teare et al. | 380/21 |
| 5,247,575 | 9/1993 | Sprague | 380/9 |
| 5,296,884 | 3/1994 | Honda | 354/106 |
| 5,321,753 | 6/1994 | Gritton | 380/42 |
| 5,343,529 | 8/1994 | Goldfine | 380/23 |
| 5,347,580 | 9/1994 | Molva | 380/25 |
| 5,349,459 | 9/1994 | Reed | 359/142 |
| 5,363,448 | 11/1994 | Koopman | 380/23 |
| 5,379,224 | 1/1995 | Brown | 364/449 |
| 5,382,957 | 1/1995 | Blume | 342/43 |
| 5,384,846 | 1/1995 | Berson | 380/23 |
| 5,386,117 | 1/1995 | Piety | 250/330 |
| 5,388,158 | 2/1995 | Berson | 380/23 |
| 5,390,245 | 2/1995 | Dent | 380/23 |
| 5,390,297 | 2/1995 | Barber | 395/200 |
| 5,406,619 | 4/1995 | Akhterruzzaman | 379/95 |
| 5,408,217 | 4/1995 | Sanderford | 340/506 |
| 5,440,301 | 8/1995 | Evans | 340/870.11 |
| 5,442,342 | 8/1995 | Kung | 340/825.34 |
| 5,451,757 | 9/1995 | Heath | 235/382 |
| 5,499,294 | 3/1996 | Friedman | 380/10 |
| 5,506,644 | 4/1996 | Suzuki et al. | 354/106 |
| 5,508,736 | 4/1996 | Cooper | 348/144 |
| 5,521,887 | 5/1996 | Loomis | 368/47 |
| 5,526,291 | 6/1996 | Lennen | 364/571.02 |
| 5,530,759 | 6/1996 | Braudaway et al. | 380/54 |
| 5,541,845 | 7/1996 | Klein | 364/449 |

SECURE AUTHENTICATION OF IMAGES

FIELD OF THE INVENTION

This invention relates to identification of the circumstances under which a visual image was formed, and authentication of the image.

BACKGROUND OF THE INVENTION

The parallel development of telecommunications and of computers over the last 25 years has allowed an awesome increase in data throughput and data analysis. Much of the business information that was once hand delivered by a known and trusted intermediary is now delivered electronically. For example, the Internal Revenue Service now encourages electronic filing of tax returns and related information and provides facilities for no-cost data transmission in some instances. Financial transactions, such as funds transfer and payment of invoices, are now routinely handled by electronic messaging. Electronic offices, both mobile and stationary, are now commonplace, along with cellular telephones, mobile facsimile machines and other accoutrements of this new age.

Unfortunately, this rise in computer power and data transmission power has brought an increase in the possibility of electronic mischief, unintentional and intentional, benign and injurious. A transmitter of an encrypted message is usually concerned with (1) delivery of the message only to its intended recipient(s) and (2) encryption of the message so that a message received by an unintended recipient cannot be decrypted to become privy to the intelligence contained in the message. However, the recipient of this message has somewhat different concerns, including a means of verifying that the message received was, in fact, transmitted by the putative sender. The message transmitter is concerned with secrecy and selectivity of the message recipients. The intended recipient is concerned with receiving and taking appropriate action only on messages for which the putative message source is the true or authentic source. If the putative source is not the actual source, the message may contain selective disinformation, intended to mislead the recipient or to cause the recipient to take action that the recipient would not otherwise take. For example, the Time magazine issue for 26 Jun. 1995, on page 65, reports some of the problems faced by Internet participants who are receiving fake e-mail messages, transmitted by someone other than the asserted sender of such messages.

Opto-electronic technology now allows a user to form an image using a digital camera, defined here to mean a visually perceptible image that is digitally expressed as an assembly of picture elements or pixels. Once an image is formed by opto-electronic means, the user may wish to include certain accompanying information indicating the circumstances under which the image was formed. If the image is to be used for some legal or related purpose, the user may wish to insure that the image or the accompanying information not be tampered with or corrupted.

Relatively few workers in electronic communications have seriously considered approaches for authenticating the putative source of information in the form of text or an image that is delivered electronically or by some means other than a trusted intermediary. Encryption using destination addresses using a TDMA satellite communications system is disclosed in U.S. Pat. No. 4,418,415, issued to Fennel et al. A common encryption/decryption key is held by all authorized users of a network. This key is EXclusively ORed with the specified destination address, and the output (digital) signal is passed through an encryption engine, on the satellite and at the intended ground-based receiver, using the same key or another key. The encryption engine output signal is then combined with the channel data to be transmitted in another EXclusive OR circuit and transmitted to the network users. Each of the receivers receives the message and reverses the encryption process, using its own destination address as part of the decryption key. However, only the (single) intended receiver produces a cleartext message that is comprehensible.

Hanas et al. in U.S. Pat. No. 4,709,266, disclose use of a satellite scrambling network to provide messages that are scrambled or encrypted differently for different geographical regions. This is useful for distributing scrambled video, voice and data subscriber messages. A master uplink message (ground-to-satellite) is used to control the scrambling or encryption commands that determine the scrambling applied to each geographical area and/or to groups of individual subscribers.

In U.S. Pat. No. 4,860,352, Laurance et al disclose a satellite communication system that provides authentication of a data transmission based upon the location of the data transmitter, as determined by the satellite communication system itself. The message sender transmits a message and the sender's location to a satellite, which retransmits the message and sender location to a ground-based receiver that compares the sender's stated location with the known location for the putative source of the message. Optionally, the message and/or the sender location are encrypted. If the two sets of transmitter location information agree, the message and its source are accepted as valid or authenticated. If the the two sets of such information do not agree, the receiver discards the remainder of this message as originating from an invalid sender. The message originator may be stationary or mobile. In one embodiment, a mobile message originator sends its present location and its location at the time the preceding message was sent, in encrypted text. A receiver receives the preceding location information and compares this with the known preceding location to verify or refute the preceding location of the putative source. In a second embodiment, three spaced apart satellites receive the same message and, based upon differences in time of receipt, determine the present location of the message originator. The message and this present location information are transmitted to a ground-based receiver, which compares the originator's present location with the known preceding location of the message originator, to verify or refute (within certain geographical limits) that the message originator is the putative source of the message. Some of the embodiments appear to require foreknowledge of the location, as a function of time, of the authentic message originator.

The inventors in the Laurance et al patent distinguish between (1) an "active attack," whereby an unauthorized person or the (faulty) transmission channel itself receives and alters the message and subsequently causes the message to be delivered to the recipient, and (2) a "passive attack," whereby an unauthorized person receives but does not alter the message that is delivered to the recipient. A third type of attack may be characterized as origination of a fraudulent message by a non-legitimate source, where the putative message source is not the actual message source. Active and passive attacks have traditionally been combated by message encryption. Once the encryption method is broken and available for use by an unauthorized person, that encryption scheme is less than useless. Successfully combating an active attack and/or fraudulent origination requires more than message encryption: the message source must be authenticated and/or the received message must be verified as unaltered after its transmission by the putative source.

Horne, in U.S. Pat. No. 4,887,296, discloses a three-key cryptographic system for a direct broadcast satellite system, to be used in video broadcasting to a plurality of ground-based receivers, each having a unique address number. A signature key, which is an encryption using the address number for that receiver, is stored in the receiver at the time of manufacturing. At the transmitter, a common key is encrypted, using the unique signature key for a receiver that is targeted for a portion of the message to be transmitted. The data stream contains message portions intended for all receivers and message portions intended for, and decryptable only by, individual receivers. A target receiver decrypts its messages, using the common key and signature key used by the transmitter to encrypt the receiver's portions of the message.

U.S. Pat. No. 4,916,737, issued to Chomet et al, discloses an anti-piracy television program scrambling/descrambling system that allows the encryption/decryption code to be changed periodically (e.g., once per month) by communication from the head end or central station. The receiver's decryption unit has an unalterable ROM portion, containing its unique serial or address number, and an EPROM portion, containing an alterable ROM portion with a look-up table that can be changed by receipt of special signals from the head end.

U.S. Pat. No. 4,993,067, issued to Leopold, discloses a secure satellite-ground communication system that provides over-the-air encryption rekeying. A message transmitted from a proper ground station to the satellite must contain the ground station location. If the location of the ground station is not included in the message, or if this location is included but is not on an approved list maintained by the satellite, the received message is discarded. If the ground station location is acceptable, the satellite accepts the message and rekeys itself according-to the rekeying information contained in the remainder of the message. This approach appears to require that the ground stations on the approved list be stationary.

Signal encryption apparatus that uses a common data key component and a specialized data key component, for a plurality of communicating sites, is disclosed in U.S. Pat. No. 5,115,467, issued to Esserman et al. The specialized data include distinct parameter values that are associated with only one communicating site. The encryption generating key depends upon the common data key component and upon the specialized data key component so that the encryption key used for each site may be distinguishable. The invention is useful in receipt and processing of television signals generated at a plurality of fixed sites.

Graziano et al, in U.S. Pat. No. 5,191,613, disclose a knowledge-based system for the electronic equivalent of signature authentication of a document, such as an agreement, transmitted from a sender to a recipient.

The document, in electronic form, is temporarily locked into a computer memory so that no modifications can be made to the document or its format. Each of the document signatories then applies its own tests and comparisons to verify electronically that the document is authentic and unaltered. After this authentication process, each signatory affixes its electronically-based signature to the document to activate the terms of the agreement.

In U.S. Pat. No. 5,221,925, Cross discloses a location interrogation system in which a mobile unit, upon receipt of an interrogation signal, transmits its present location in a conventionally encoded format to a central station that has issued the interrogation signal, to assist in tracking the mobile unit.

A verification procedure for mobile stations in a cellular network is disclosed by Raith in U.S. Pat. No. 5,237,612. In response to receipt of a random challenge signal or interrogation, the mobile station transmits to the central station a first response signal, depending only upon an unchanging, commonly-held encryption key, and a second response signal, dependent upon a changeable encryption key. The first and second response signals are analyzed by an authentication algorithm to authenticate, or deny authentication to, the putative mobile station.

U.S. Pat. No. 5,243,652, issued to Teare et al, discloses a communication system for control of access to a location-sensitive remote database. A central station stores and transmits encrypted television material whose encryption key is available only for a viewers in a specified geographical area, as determined by a GPS or Loran location determination system. A secure version of the location history of the mobile user is transmitted to a central facility and compared with the known location history of this user. If the two histories agree, the identity of the user is confirmed, and a decryption key associated with this location history is transmitted to the user, for use in decrypting the encrypted television transmission.

Transmission of encrypted information packages from a central site to a remote site, in response to receipt of a request for specified information from that site, is disclosed in U.S. Pat. No. 5,247,575, issued to Sprague et al. The encryption key is changed periodically (e.g., weekly), but does not depend upon any past information.

Honda et al, in U.S. Pat. No. 5,296,884, discloses a camera that allows recording of location and/or time as a supplement to the frame image, where the location/time information is provided by signals received from a Loran, Decca, Omega or GPS signal source. The location/time information appears to be recorded separately from the camera image, perhaps on an adjacent strip of film. A similar device that uses earlier location-indicating instruments is disclosed by Rick et al in U.S. Pat. No. 4,122,521.

Earlier patents that allow recording of exposure information, exposure time/date, distance to a selected object in view, or local terrain detail, on film or in a viewfinder at the time a camera forms an image on the film, include U.S. Pat. No. 3,872,483, issued to Numata et al, No. 3,882,512, issued to Lawrence et al, No. 3,968,505, issued to Kauneckas, No. 4,053,240, issued to Aizawa et al, No. 4,064,515, issued to Mashimo et al, No. 4,149,795, issued to Sakurda et al, No. 4,175,848, issued to Murakami et al, No. 4,361,388, issued to Mlcak et al, No. 4,635,203, issued to Merchant, No. 4,695,959, issued to Lees et al, No. 5,045,937, issued to Myrick, and No. 5,386,117, issued to Piety et al.

A secure communication system for static information is disclosed in U.S. Pat. No. 5,321,753, issued to Gritton. The message transmitted includes a 10-bit static first data field and a 54-bit second data field that changes from one transmission to the next. The 64-bit first and second data fields are encrypted and transmitted to a remote message reader that receives, decrypts and reads the transmitted message.

Goldfine et al disclose a financial or telephone service transaction authentication system, in U.S. Pat. No. 5,343,529, in which any attempt to gain access to a protected system is thereafter answered and controlled by a centralized authentication agency. In response, the agency issues an identification request, requesting information that is unique to that request; a subsequent attempt by that person to gain access would require submission of different information. If the information supplied by the access seeker matches the information on file, the access seeker identity is authenticated and access is granted.

In U.S. Pat. No. 5,347,580, Molva et al disclose an authentication method using a smartcard to encrypt the presently displayed time with a cryptographically strong key. A public work station receives the encrypted time message, generates one or more values from this message, and further encrypts and/or transmits these values to a server station. The server station uses the received values to authenticate the holder of the smartcard and to accept or reject a message or command from the holder.

A remote control transmitter-receiver pair that cooperatively implement a code transmission sequence that minimizes energy use and protects the communication channel from unauthorized access is disclosed in U.S. Pat. No. 5,349,459, issued to Reed. The transmitter issues a specified sequence of start/stop pulses of different lengths, similar to pulse code modulation, which are received by the receiver and compared with a copy of this sequence. If the sequences agree, the receiver authenticates the transmitter and opens the secured channel to receive the remainder of the message.

Generation of each of two pseudorandom numbers, by an independently chosen number of iterations on initial numbers, is the basis for a cryptographic authentication system disclosed by Koopman et al in U.S. Pat. No. 5,363,448. The two pseudorandom numbers are concatenated and encrypted into a single word. This word is transmitted by or on behalf of a person seeking access to a protected system, and the word is decrypted and deconcatenated to produce the two pseudorandom numbers, for comparison and authentication purposes. Immediately after the concatenated and encrypted word is received, the receiving system locks out receipt of any additional signals for a selected time interval, such as 0.5 sec. Thus, breach of the protected system by rapid, exhaustive, numerical trials is made difficult or impossible.

Blume discloses a system to allow a space platform to distinguish between a friendly object and an unfriendly object in U.S. Pat. No. 5,382,957. The platform, which includes a GPS receiver/processor and antenna, transmits an encrypted interrogation signal to the object, which can be positioned tens or hundreds of kilometers from the platform, requesting certain information including the location coordinates of the object. Simultaneously, the platform uses high directivity radar and line of sight measurements to estimate the object range and the object location coordinates, using the platform's GPS-based knowledge of its own location. A friendly object will reply to the encrypted interrogation signal with an authenticating reply, including the GPS-determined location coordinates of the object. A receiver on the platform receives the object location coordinates from the object and compares these coordinates with its own estimate of the object location coordinates. If the object-supplied object location is within a determinable distance of the platform-supplied object location and all other authenticating replies from the object are appropriate, the platform authenticates the object as a "friendly" object.

In U.S. Pat. Nos. 5,384,846 and 5,388,158, Berson et al disclose methods for authentication of an identification card and the holder thereof. Several physical or other characteristics of the bona fide holder of the card are encrypted and recorded on a magnetic strip on the card, using a public key encryption scheme in which the key is changed from time to time. When the card is presented, the magnetic strip information is reproduced and compared with the corresponding characteristics of the card holder, to verify or refute the putative identity of the card holder. In another embodiment, the contents of a document are compressed, encrypted, encoded and placed on a two-dimensional bar code label for the document, for subsequent decryption and authentication of the document by reversing the process for the information on the label.

A GPS tracking system for a mobile station with physical sensors, relying upon receipt of unprocessed GPS signals that are initially received by the mobile station, is disclosed in U.S. Pat. No. 5,379,224, issued to Brown et al. Segments of the GPS signals received and time stamps are interleaved with sensor measurements of physical data and are transmitted to and processed by a central processing station, for estimation of the location of the mobile station at the time value given by the time stamp, and for examination of the physical sensor data. The GPS signals received from the mobile station are used for location determination, not for authentication of the asserted location of the central station.

Dent et al. in U.S. Pat. No. 5,390,245, disclose system for authentication of a base station and a mobile station that communicates with the base station. A first signal and a second signal are formed at each of the base station and the mobile station, and the base station transmits its first signal to the mobile station. The mobile station compares the received first signal with its own first signal to authenticate, or deny authentication to, the base station/transmitter. The mobile station then transmits its second signal to the base station for a similar authentication procedure by the base station.

A system for controlling the number of concurrently operating copies of a licensed software package is disclosed in U.S. Pat. No. 5,390,297, issued to Barber et al. Each node in a computer network is identified, for example, by number. If a given node requests use of, and contains a valid, unexpired license for, the software package, a license manager permits use of that software package at the given node. If an applicable license is not available at the given node, the license manager interrogates other nodes to find a license for the licensed software package that is not presently being used by that node and transfers the available license to the given node.

U.S. Pat. No. 5,406,619, issued to Akhterruzzaman et al, discloses a user authentication device for messages transmitted telephonically. The authenticator device, about the size of a credit card, is held against a telephone receiver and receives a query number as part of the telephone message. The authentication device uses its own key to transform the query number into an individualized response number that is transmitted as part of the same telephone cal to the query number initiator. Each of the query number and the response number is unique to the telephonic device used for that phone call.

A fire/security/control sensor access system that prevents unauthorized access by remote sensors is disclosed by Sanderford in U.S. Pat. No. 5,408,217. A central processor and a sensor unit communicate using one or more pseudorandom number sequences that is unique for that communicating pair, and each incoming and outgoing message must produce a "match" at the central processor and at the sensor before the transmitting sensor will accept reprogramming of its facility.

Evans discloses a sensor communication system with sensor polling in U.S. Pat. No. 5,440,301. Each remote sensor is polled for its present condition by a centrally located processor, using a unique coded signal that is received and analyzed by a receiver connected to the sensor. If the coded signal has a valid format, information stored in the receiver memory is transmitted in response to receipt of a polling signal.

In U.S. Pat. No. 5,442,342, issued to Kung, a distributed user authentication protocol is disclosed that prevents unauthorized access to any computer that is part of a network. Each network user is issued a coded card with a confidential message authentication code, which must be used to gain access to a computer on the network. The user must present the card and answer a sequence of randomly selected questions. At random times during use of a computer on the network, a user is required to again answer a randomly selected sequence of questions, in order to continue to use the computer.

Apparatus for controlling access to a device, such as an automated teller machine, at a secure location is disclosed by Heath in U.S. Pat. No. 5,451,757. A technician or other worker who seeks access to the device presents an access authentication message, including the worker's personal identification number (PIN), an access code presently stored at the device, and an access code of a portable computer terminal carried by the worker for use with the device. If the PIN and the two access codes are confirmed by the device, the worker is allowed access to the device. If access to the device is allowed, the access code presently stored at the device is immediately replaced by a new access code, to be used when requesting subsequent access to the device.

Steganography, which seeks to authenticate a graphical image by concealing a message in the image, is briefly discussed by S. Walton in "Image Authentication for a Slippery New Age," Dr. Dobb's Journal, April 1995, pp. 18–26. One method of concealment expresses each pixel in an electronic representation of the image in digital form and then alters the least significant bit of a chosen number of pixels to contain an authentication message.

These inventions usually rely upon some unchanging characteristic or combination of characteristics of an entity that seeks access to a protected system or a protected communication channel. The protection offered by these approaches might easily be compromised for a communication channel that is continually or periodically transmitting information. What is needed is an approach that relies in part on the constantly changing information associated with signals produced by a location determination system, to authenticate or verify the location and/or angular orientation of the entity that forms an image that is to be authenticated. Preferably, the information relied upon for authentication should be accurately available only from the entity that formed the image. Preferably, the approach should accept and work with confidential/encrypted signals and/or with signals that are available for use by any user with an appropriate receiver for a location determination system.

SUMMARY OF THE INVENTION

These needs are met by the invention, which forms a digitally expressed image, using a digital camera and a digital image forming and storing means, and conceals image authentication information concerning the circumstances of formation of the digital image of a selected view within the image itself Preferably, this image authentication information includes the location, angular orientation, time of formation and/or distance to a selected object in the selected view, of the digitized image forming and storing means at the time the image was formed. This authentication information is provided, in part at least, by a location and/or angular orientation and/or time determination system, referred to as a position determination system ("PDS"), that is connected or attached to the digital camera and that provides the desired authentication information at the instant the digital image is formed. This authentication information is then incorporated in the digital image and/or is provided separately from and associated with the digital image. If the authentication information is incorporated in the digital image, a subset of pixels is chosen from the assembly of pixels that forms a visually perceptible image in the digital camera, and pixels in the chosen subset are individually altered to contain appropriate parts of the authentication information. The chosen subset of pixels for the image is determinable by, or known to, at least one person or facility so that this subset of pixels can be retrieved from the digital image and the authentication information can be recovered and analyzed. The pixels in the chosen subset need not be adjacent to each other and may be selected arbitrarily or according to some prescribed form, such as along a straight or curved line of pixels.

Optionally, once the digital image is formed, this image may be "frozen" within the digital camera so that this image and the associated authentication information cannot be altered or deleted in any way but can be displayed visually or downloaded and processed by an authorized downloader, to exhibit the digital image and the authentication information. The digital image and its authentication information is never transmitted to another person or facility and thus is not interceptible or vulnerable to deletion or alteration by a person or facility with a different agenda.

Optionally, the authentication information and/or the specification of the chosen subset of pixels in which this information is concealed may be encrypted, using the location and/or orientation and/or time information (optional) provided by the PDS to determine the encryption key.

If the position information and/or the specification of the pixel subset CPS is encrypted, a decryption technique, agreed upon in advance by those who are authorized to authenticate the image and position information, is applied to produce a readable message for that recipient. The encryption/decryption process may be a single key process, such as the Data Encryption Standard (DES) developed by IBM and disclosed in U.S. Pat. No. 3,798,360 and related patents, issued to Feistel. Alternatively, the encryption/decryption process may be a public key process, such as the recently developed RSA process, disclosed in U.S. Pat. No. 4,405,829, issued to Rivest, Shamir and Adelman. The header and/or trailer of any satellite message would include one or more bits indicating: (1) whether this message is encrypted; (2) the beginning and end of the encrypted portion, if any, of this message; and/or (3) an identification by alphanumeric symbols of the key to be used by the recipient to decrypt any encrypted portion of this message. When an encrypted message is downloaded and an identification of the decryption key to be used, the recipient could automatically route this message to a decryption module that would read the key identification bits and apply the correct decryption key.

Optionally, the chosen subset of pixels may be partly or fully prescribed using the position information determined by the PDS at the time the digital image is formed by the digital camera.

This invention will be useful where a digital image and its associated authentication information is to be formed and preserved for later display in, unalterable form. This invention can be used in civil or criminal proceedings before a court or administrative entity to "preserve the scene" or "preserve custody" of an image of the scene and can be used for preservation and identification of personally produced images for subsequent viewing.

DESCRIPTION OF BEST MODES OF THE INVENTION

Figure 1:
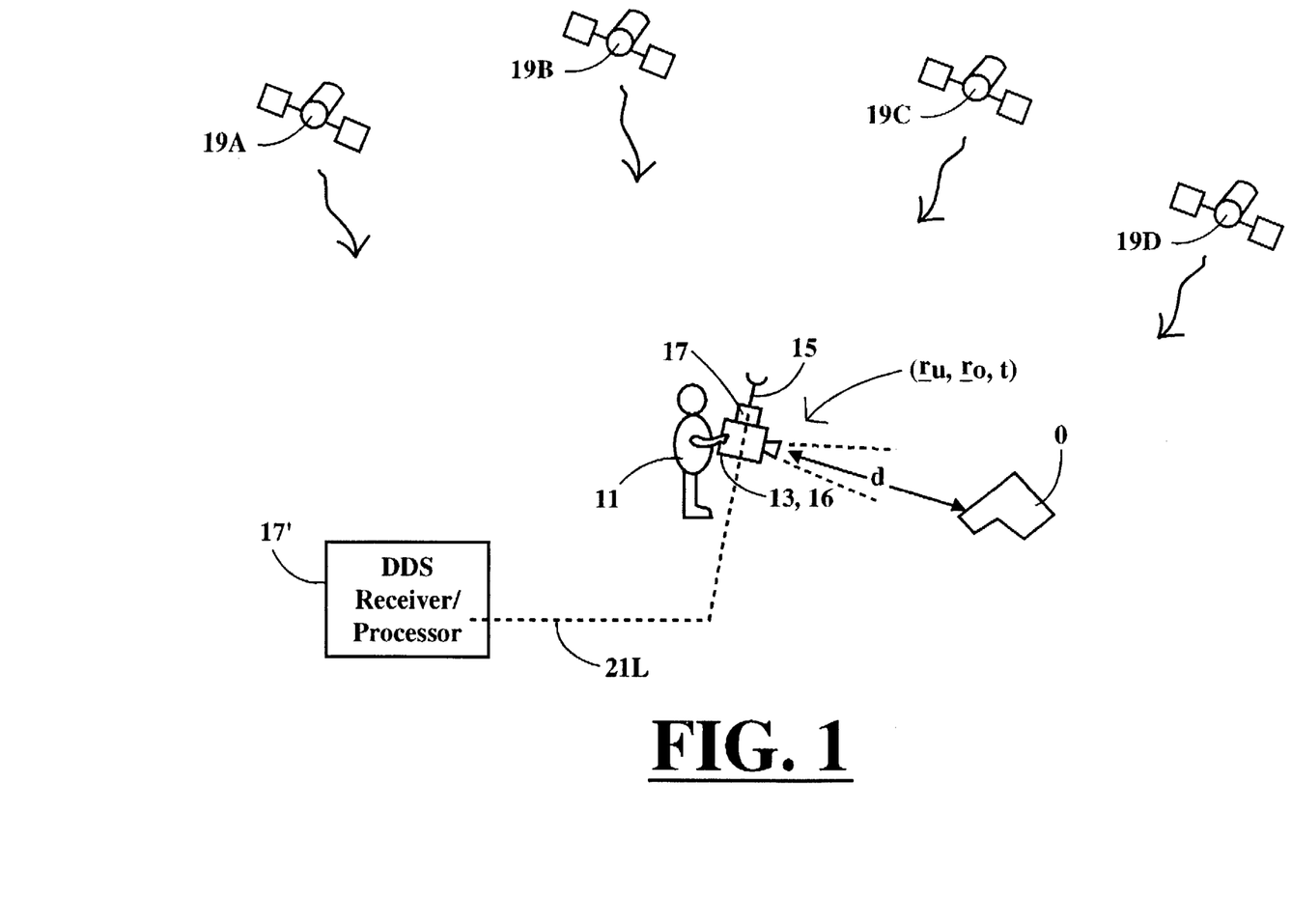
FIGS. 1 and 8 illustrate use of the invention in representative environments, where the location, angular orientation and/or time information for the PDS is provided by satellite sources of PDS signals and by ground-based sources of PDS signals, respectively.
Figure 2:
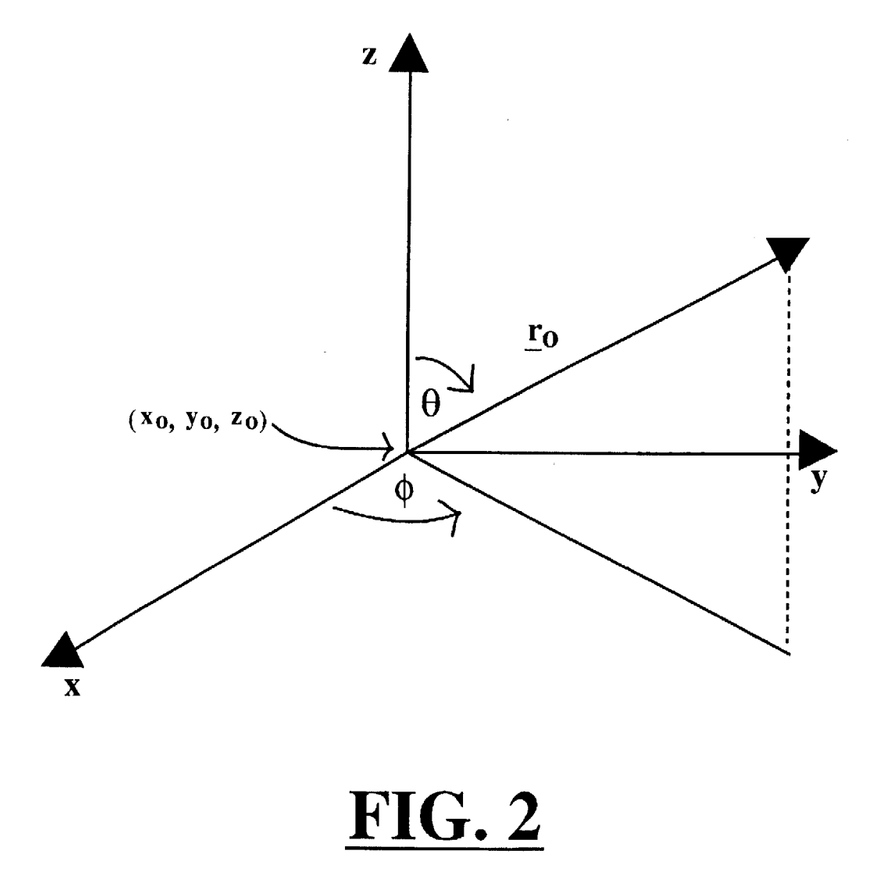
FIG. 2 illustrates the angular coordinates used to determine angular orientation of a digital camera.

FIG. 1 illustrates use of the invention in one environment. A user 11, positioned at a particular location with location vector $r_u=(x_u, Y_u, Z_u)$ in a selected coordinate system CS, points or orients a digitized image forming device ("digital camera") 13 in a selected direction having an orientation vector $r_0=(\cos\phi \sin\theta, \sin\phi \sin\theta, \cos\theta)$, where $\phi$ is the azimuthal angle and $\theta$ is the polar angle of the vector $r_o$, measured relative to the axes of the selected coordinate system CS, as indicated in FIG. 2. In FIG. 2, for definiteness, the coordinate system used for $(X_u, Y_u, Z_u)$ is assumed to be a three-dimensional Cartesian system. However, the coordinate system CS can also be a three-dimensional or two-dimensional coordinate system, as noted above.

A position determining system ("PDS") signal antenna assembly 15 in FIG. 1 is rigidly attached to the digital camera 13 and receives a PDS signal from each of a plurality of PDS satellite sources 19A, 19B, 19C, 19D, etc. of the PDS signals and passes the PDS signals to a PDS signal receiver/processor 17 that is preferably also attached to the digital camera 13. Alternatively, the PDS receiver/processor 17 can be spaced apart from, be linked to and receive signals from, the PDS antenna assembly 15 by a cable link or a wireless link 21L (optional). Optionally, the digital camera 13 includes a rangefinder 16 that determines and records the distance d from the camera lens or other digital image-forming mechanism to a selected object O in the selected view.

The PDS receiver/processor 17 receives the PDS signals from the PDS antenna assembly 15 and determines the location and/or angular orientation of the PDS antenna assembly (or digital camera) and/or time of receipt/ observation of the PDS signals, using the times of arrival of the PDS signals from the different PDS satellite signal sources 19A, 19B, 19C, 19D and the known locations of these sources at any given time. The PDS satellite signal sources may belong to a Global Positioning System ("GPS"), to a Global Orbiting Navigational Satellite System ("GLONASS") or to any other suitable geosynchronous or non-geosynchronous satellite system that broadcasts timed signals that can be used to determine location and/or angular orientation and/or time of receipt/observation of a receiver of such signals, such as the Motorola 66-satellite Iridium system or the LEO (Low Earth Orbit) satellite system.

Figure 3:
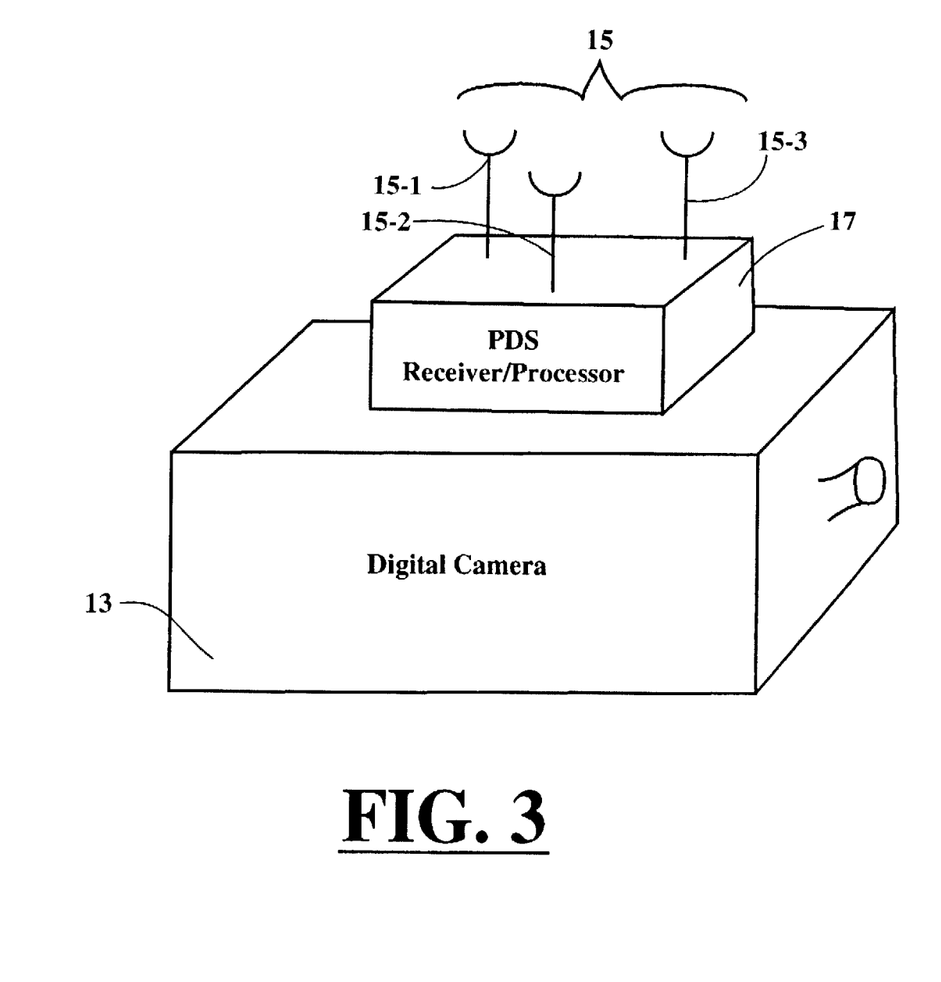
FIG. 3 is a schematic view of placement of three component antennas included in the antenna assembly for angular orientation determination according to one embodiment.

If angular orientation $(\phi,\theta)$ of the digital camera 13 is to be determined, the PDS signal antenna assembly 15 includes three or more spaced apart, non-collinear, PDS signal-receiving component antennas 15-1, 15-2, 15-3, shown in FIG. 3, that define a plane or other two-dimensional surface and whose distances from each other are known and preferably fixed. In this configuration, a PDS signal received at each of the component antennas 15-1, 15-2, 15-3 from a given satellite source, such as 19B, is received by multiplexing at the PDS receiver/processor 17; and the different times of arrival of this PDS signal at the different component antennas determines the angular orientation of a plane or other geometric object containing these component antennas. The PDS component antennas 15-1, 15-2, 15-3 may be rigidly attached to the digital camera 13. Alternatively, one or more of these PDS component antennas 15-2 and/or 15-3 may be snappable into place at fixed angle and/or at a fixed distance relative to another component antenna 15-1, whose location on the digital camera 13 is fixed.

Figure 4:
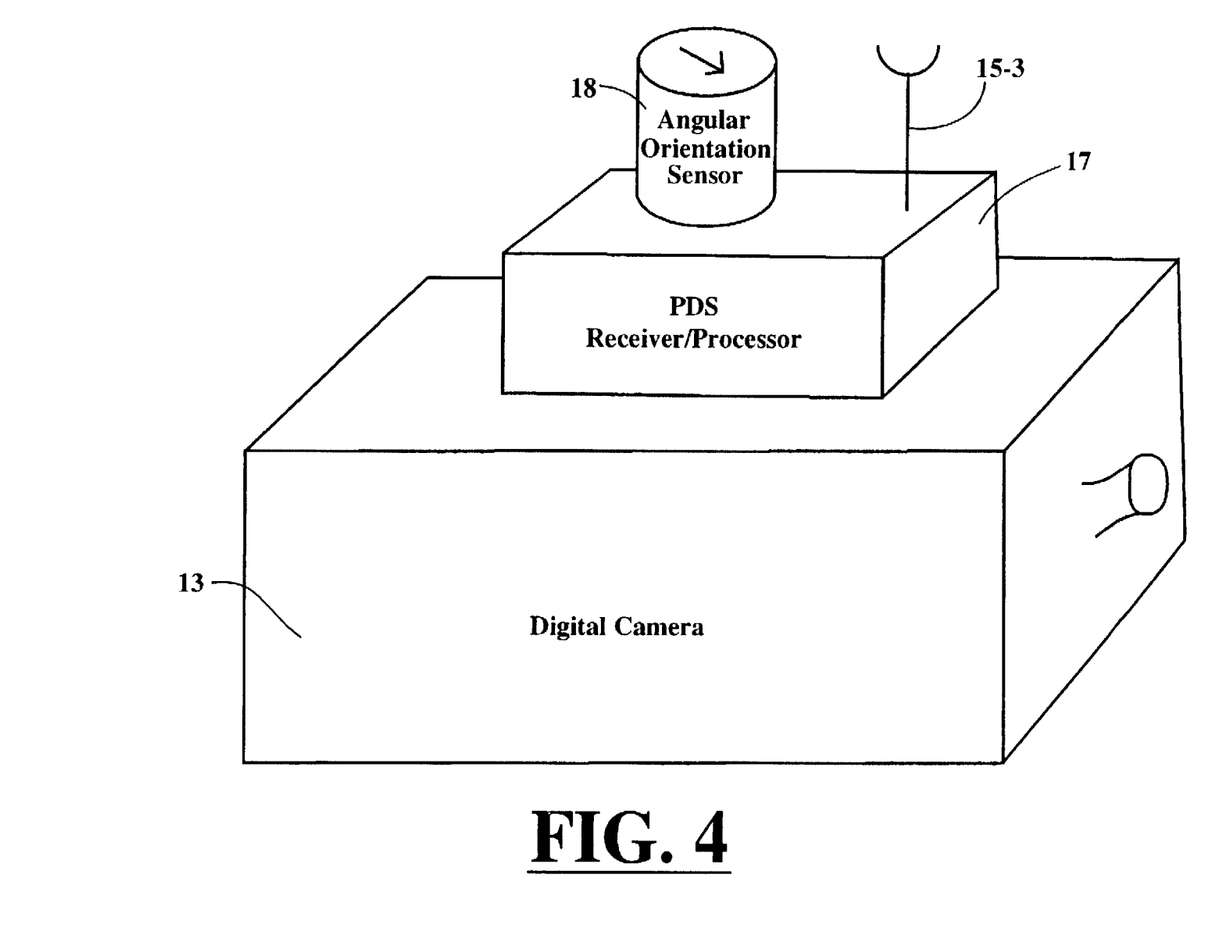
FIG. 4 illustrates determination of angular orientation by a means other than that used in FIG. 3.

Alternatively, where angular orientation $(\phi,\theta)$ of the digital camera 13 is to be determined, this orientation information can be determined using attitude-sensing means other than the three or more location-sensing antennas shown in FIG. 3. Angular orientation or attitude of the digital camera 13 can be sensed by using two or more accelerometers, by using two or more gyroscopes, or by using two or more magnetic field-sensing instruments, referenced to the local direction and/or magnitude of the Earth's magnetic field, as indicated schematically in FIG. 4. Any other accurate attitude sensor 18 that does not rely upon PDS-based determination of the location of a plurality of PDS signal antennas can also be used to determine angular orientation of the digital camera 13.

If angular orientation $(\phi,\theta)$ of the digital camera 13 need not be determined, the PDS signal antenna assembly 15 may include a single antenna, to be used to receive PDS signals at a location that is rigidly attached to the digital camera.

The user 11 points or orients the digital camera 13 and records a digital image of a selected view, as indicated in FIG. 1. At the time this image is recorded, the PDS antenna assembly 15 and PDS receiver/processor 17 receive and analyze PDS signals and determine the present location and/or angular orientation and/or time of receipt/observation of the PDS signals, referred to collectively as "position information" for convenient reference. Optionally, this position information includes the camera-object distance d determined by the rangefinder 16, discussed above.

Figure 5:
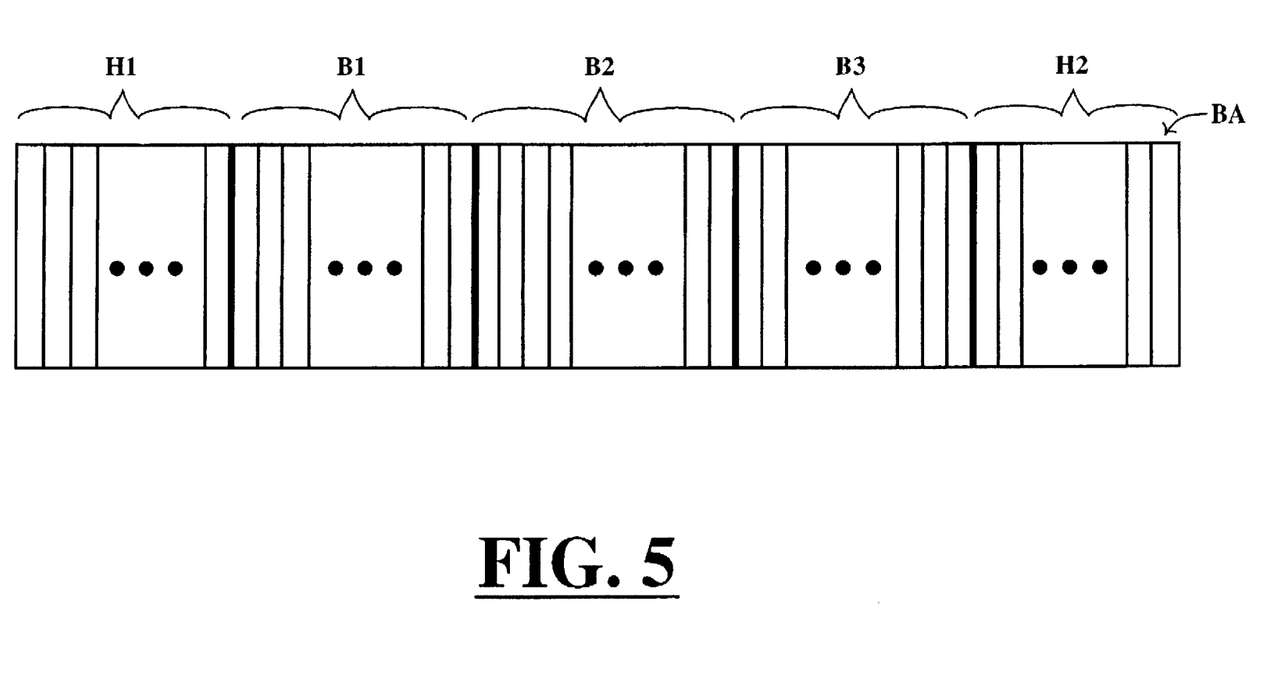
FIG. 5 illustrates one suitable array of bits that provide location, angular orientation and/or time information according to the invention.

In a first embodiment of the invention, the position information is automatically recorded separately at the time the digital image of the selected view is recorded, and the digital image and the position information are associated or bound together for future use. For example, the digital image may be recorded, in sub-frame N-1 and the position information may be recorded in a contiguous sub-frame N-2 (of smaller size), which are both parts of frame N. Sub-frame N-2 is illustrated in FIG. 5 as a linear bit array BA of bits, including an optional header having H1 bits, B1 bits containing the location coordinates or related location information for the digital camera, B2 bits containing the angular orientation coordinates or related orientation information for the digital camera, B3 bits containing time of receipt/observation information for the digital camera, and an optional trailer containing H2 bits. The numbers H1, B1, B2, B3 and H2 are non-negative integers, and least one of the integers B1, B2 and B3 is positive.

In FIG. 5, B1 or B2 or B3 is a positive integer only if the corresponding position information item (location, angular orientation or time) is recorded and included in the bit array BA. If location information is recorded, for example, each of the two or three location coordinates $X_u$, $Y_u$ and/or $Z_u$ might be allocated 16 or more bits in the bit array BA to express the corresponding location coordinate in the location coordinate system chosen (Cartesian, polar, cylindrical, spherical, ellipsoidal, etc.) for such representation. If angular orientation information is recorded, each of the one or two angular coordinates $\phi$ and/or $\theta$ might be allocated 16 or more bits in the bit array BA. If time information is recorded, this information might be allocated 16 or more bits in the bit array BA.

In a second embodiment of the invention, the position information is recorded as an overlay (optionally visually perceptible) on digital image of the selected view formed by the digital camera 13. This overlay preferably includes the location information and/or the angular orientation information and/or the observation time information for the PDS signal antenna assembly 15 at the time the digital image is formed. This overlay, illustrated in FIG. 6 as a region called "position information," is preferably located near a boundary or other selected site on the digital image that is unlikely to interfere with visual perception of the important details in the digital image of the selected view. This embodiment offers the advantage that the position information is viewable when the digital image is viewed.

Figure 6:
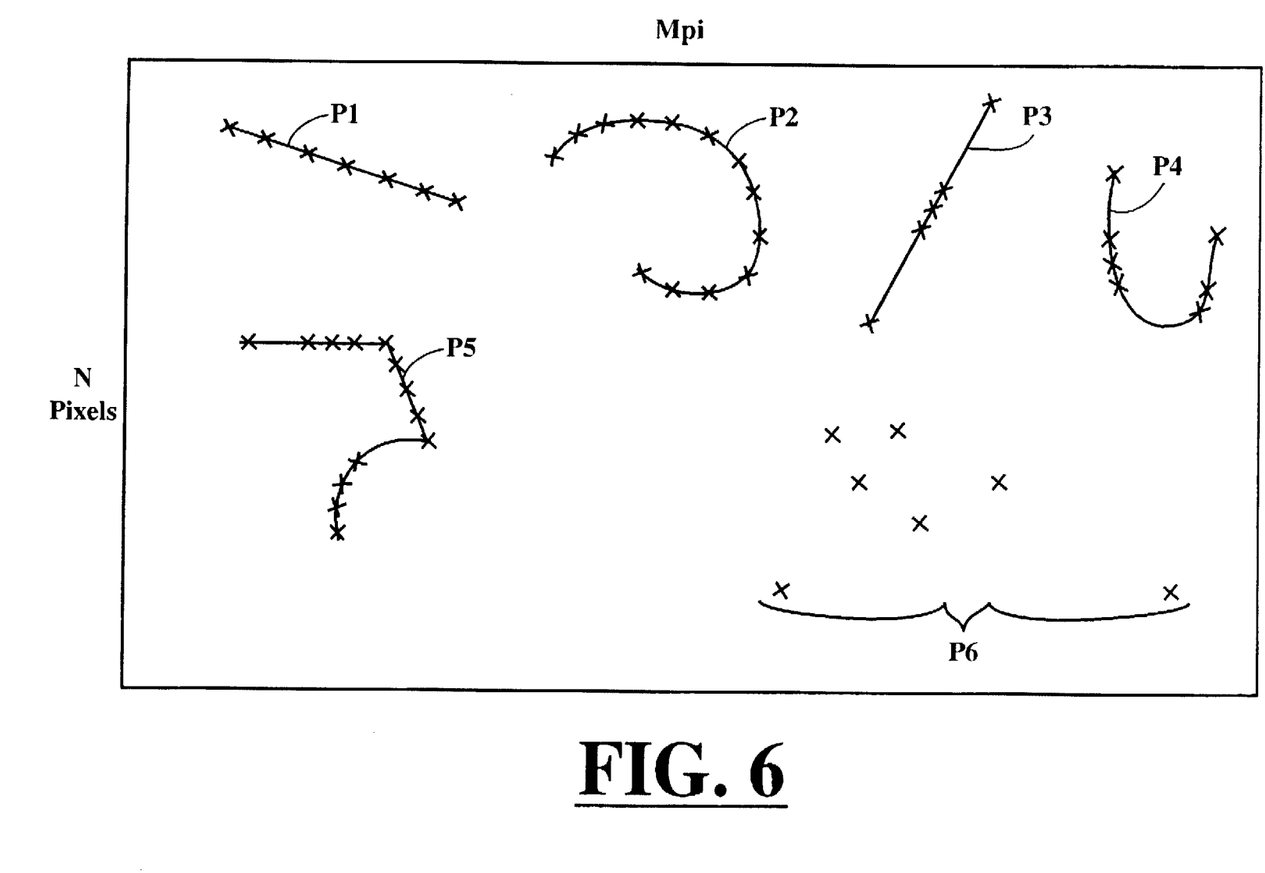
FIG. 6. illustrates several possible pixel patterns that can be chosen for storage of position information to be used for authentication of the digital image, according to one embodiment of the invention.

In a third embodiment of the invention, the position information is automatically recorded or embedded as part of the corresponding digitally expressed image formed by the digital camera, using a bit array A such as shown in FIG. 6. An authentication pattern P of pixels, which is a chosen pixel subset CPS of all pixels in the array PA of all pixels representing the digital image, is selected. For each pixel in the pattern P, one or more bits in the representation of the pixel value is replaced by a bit in the bit array BA, and the original digital image is re-formed as a modified digital image, now containing the position information recorded at the time the original digital image was formed. It is the modified digital image that is stored in the digital camera. The pixel value corresponding to the original digital image may be: (1) a binary value (one bit, black or white, used for text and for line drawings and line graphical images); (2) a gray scale value (J bits with $J \geq 2$, used to represent gray scale images with black, white and up to $2^J - 2$ gray scales lying between black and white); (3) color values (J bits with $J \geq 8$, used to represent R,G,B or C,Y,M,K or some other suitable expression of up to $2^J$ colors in a spectrum, including black and white); and (4) any other suitable pixel value representation.

FIG. 6 illustrates several possible authentications patterns P that may be chosen here but is not intended to exhaust the possibilities. Possible patterns include a linear contiguous pattern P1 of pixels, a curvilinear contiguous pattern P2 of pixels, a pattern P3 of non-contiguous pixels located on a line, a geometric pattern P4 of non-contiguous pixels located on a curve, a geometric pattern P5 of non-contiguous pixels located along an open or closed linear or curvilinear polygon, and a randomly selected pattern P6 of pixels.

The authentication pattern P6 may be selected by reference to, or using, the position information recorded with the digital image. As one example of this selection, if the pixels in the digital representation form an M×N array, assign a distinct number $m = 0, 1, 2, \ldots, M \cdot N - 1$ to each pixel in the pixel array PA. Now express the recorded position information, not as a bit array as shown in FIG. 5, but as a more familiar decimal array of "decimal integers" (each being 0, 1, 2, 3, 4, 5, 6, 7, 8 or 9, a decimal point, or a sign bit ±1). In this decimal array, each of the location coordinates $X_u$, $y_u$ and/or $z_u$ is allocated Q+1 decimal integers, each of the angular coordinates $\phi$ and/or $\theta$ is allocated R decimal integers, and the time information is allocated S decimal integers, where Q, R and S are non-negative integers. Assume that the location coordinates $x_u$, $y_u$ and $z_u$ are expressed as $(\epsilon_x, d_{x,1}, d_{x,2}, \ldots, d_{x,Q})$, $(\epsilon_y, d_{y,1}, d_{y,2}, \ldots, d_{y,Q})$ and $\epsilon_z, d_{z,1}, d_{z,2}, \ldots, d_{z,Q})$, respectively, where $\epsilon_x$ has the value +1 or −1, corresponding to the sign of the coordinate $x_u$, and each of the quantities $d_{x,n}$ (n=1, 2, . . . , Q) is a decimal integer. The pixel pattern P is then chosen as follows. Beginning with the pixel numbered m=m0=0, if $\epsilon_x = +1$, or with the pixel numbered m=m0=1, if $\epsilon_x = -1$, in the pixel array PA, the first Q pixels in the pattern P correspond to the pixel array numbers m0+2$d_{x,1}$, m0+2$d_{x,1}$+2$d_{x,2}$, . . . , m0+2$d_{x,1}$+2$d_{x,2}$+ . . . +2$d_{x,Q}$=m0'. This encodes the location coordinates $x_u$. Beginning with the pixel numbered m=m0', if $\epsilon_y = +1$, and with the pixel numbered m1=m0'+1, if $\epsilon_y = -1$, the next Q pixels in the pattern P correspond to the pixel array numbers m1+2$d_{y,1}$, m1+2$d_{y,1}$+2$d_{y,2}$, . . . , m1+2$d_{y,1}$+2$d_{y,2}$+ . . . +2$d_{y,Q}$=m1'. This encodes the location coordinates $y_u$. This selection of pixel locations continues with the Q pixel locations corresponding to the location coordinate $Z_u$, the R pixel locations corresponding to the angular coordinate $\phi$, the R pixel locations corresponding to the angular coordinate $\theta$, and the S pixel locations corresponding to the time information.

The set of pixel locations in the authentication pattern P is a maximum of 3Q+2R+S pixels, although fewer pixel locations can be used if desired. This set of (at most) 3Q+2R+S pixel locations can be augmented by additional pixel locations, selected using information in addition to the position information. Alternatively, the set of pixel locations in the pattern P used to record the position information can be generated according to some other selection procedure, including purely random pixel selection.

The authentication pattern P may be chosen so that every region $\pi$ of pixels with diameter (measured in units of pixel-to-pixel nearest neighbor distance) satisfying dia($\pi$) $\geq$ D has at least one pixel from the pattern P in the region $\pi$, where D is a selected value in the range 5–50. The value D is chosen so that any visually perceptible object having a diameter of at least, say, 1 cm. when measured on the pixel representation of the digital image, will have at least one pixel from the pattern P. Alternatively, the pattern P can be a large fraction, such as 50–100 percent, of all the pixels in the array Pa, in an interleaved pixel pattern, so that it is substantially impossible to alter the pixel value of two or more contiguous pixels in the digital image without discovery. However, this would require use of a relatively slow procedure to form the modified digital image and use of a relatively slow procedure to analyze and authenticate a putative image.

In an alternative approach, the original (unmodified) digital image is stored and "frozen," in addition to the modified digital image that contains the position information. The bit array of the original digital image can be compared with the bit array of the modified digital image to determine (1) which bits in the bit array were changed, (2) whether each changed bit is one of the chosen pixel subset CPS of bits that contains the position information, and (3) whether the bit value (e.g., 0 or 1) of each changed bit in the modified digital image is correct, based on the position information the chosen subset CPS is to contain.

Once the authentication pattern P is selected, one or more bits in the pixel value representation for each pixel in the pattern P (or selected subset CPS) is replaced by a bit from the ordered bit array BA (FIG. 5) that represents the position information. In one preferred mode of this third embodiment, the least significant bit ("LSB") of each of the pixel value representations for pixels in the pattern P is replaced by a bit in the bit array BA. Where gray scale or color representations of an image are used with $N \geq 8$ bits, change of the LSB from 0 to 1, or from 1 to 0, will not be detectable by most persons so that after such LSB replacement the modified digital image (in visually perceptible form) will be substantially the same as the original digital image.

In a second mode of this third embodiment, two or more bits, or even all bits, in a pixel value representation, for one or more pixels in the pattern P, are replaced by bits from the bit array BA (FIG. 5) of position information. With this last mode implemented, the modified visually perceptible image may be substantially different from the original visually perceptible image and may have a "salt and pepper" visual appearance wherever the number of pixels in the pattern P in a region of the pixel array PA is large.

In the first, second and third embodiments, the position information, shown in bit array format in FIG. 5, can be presented in cleartext or can be encrypted, using an encryption algorithm with a selected encryption key and a corresponding decryption key. The selected encryption key can be prescribed independently of the content of the position information.

Alternatively, the encryption key can depend upon the content of the position information. In this alternative approach, a selected part of, or all of, the position information is treated as one or more parameters that determine the encryption key. For example, the location information and/or angular orientation information and/or time information can be expressed in bit array format and can be combined, bit by bit, with a selected bit pattern of appropriate length L, using EXclusive Or or EXclusive NOR or twos complement addition, to form an encrypted bit array $BA_{enc}$. The encrypted bit array $BA_{enc}$ is then placed in the second sub-frame associated with the digital image in the first sub-frame (first embodiment) or is used to replace selected bits in the pixel value representation for the pixels in a pixel pattern P, such as shown in FIG. 6.

Figure 7:
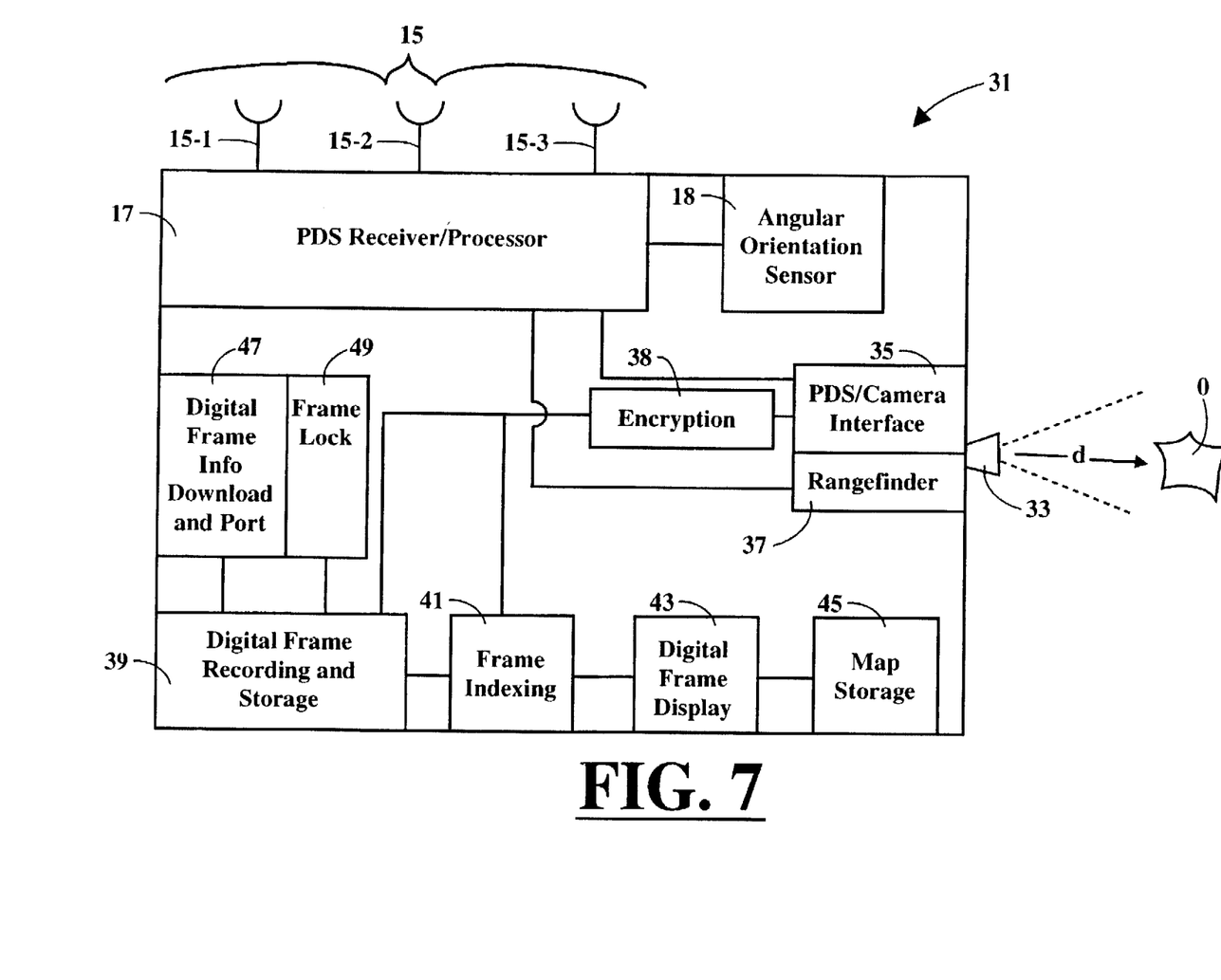
FIG. 7 is a schematic view of one embodiment of the digitized image forming apparatus and PDS signal antenna and receiver/processor apparatus according to the invention.

FIG. 7 schematically illustrates one embodiment of PDS/digital camera apparatus 31 according to the invention. A digitally expressed image of an object O is captured by means of a digital camera lens, focusing and shutter mechanism 33 and is passed through a PDS/camera interface 35. The PDS/camera interface 35 also receives information from a PDS signal receiver/processor 17 that determines position information (location coordinates and/or angular orientation coordinates and/or time of observation of position and/or distance to the object O) based upon PDS signals received at a PDS signal antenna assembly 15. Optionally, the PDS signal antenna assembly 15 may include a single PDS signal antenna 15-1 or may include two or more PDS signal component antennas 15-1, 15-2, 15-3. Optionally, a rangefinder 37, with an optical or electronic signal that can be directed to a selected object O in the selected view, that provides information on the distance d from the digital camera lens mechanism 33 to the object O for analysis and/or digitization by the PDS receiver/processor 17.

Optionally, the apparatus 31 includes an attitude or angular orientation sensor 18 that uses signals that are partly or fully independent of the PDS signals received at any of the PDS antennas 15-1, 15-2, 15-3, such as accelerometer signals, gyroscopic signals or magnetic field signals from the Earth's local field, to determine the angular orientation or attitude of the apparatus 31 at the time a digital image is formed. In this instance, use of a single PDS antenna 15-1 may suffice here.

The PDS/camera interface converts the image of the object O captured by the lens mechanism 33 into an array of K-bit, digitally expressed pixel values, using a CCD (charge coupled device) array or other array of M×N optical sensors, with each pixel or cell corresponding to a pixel or picture element for the digital image. The number of bits K for each pixel value may be $K \geq 1$ for text or simple line drawings, $K \geq 8$ for gray scale images, and $K \geq 16$ (preferably $K \geq 24$) for color images. Where a color image is captured and digitally expressed by the lens mechanism 33, 8 bits may be used for expressing image intensity and K-8 bits may be used to express the color hue and/or color saturation data for the image. The pixel array size may be M×N =100×133, 480×640, 480×720, or some smaller or larger size.

The digitally expressed image for the object O is combined or paired with the digitally expressed position information received from the PDS receiver/processor 17 at the PDS/camera interface 35 and is passed to an encryption module 38 (optional) and to a digital frame recording and storage module 39 for "permanent" storage therein as a digital frame or file. As noted above, the digital image and the corresponding digitized position information may be stored as two subframes that are part of the same digital frame, or the position information may be stored as part of the digital image, with one or more altered pixel value bits that contain position information. Optionally, a sequence of two or more digital frames, such as a digital video sequence, may be thus formed, recorded and stored in the frame recording and storage module 39. A digital frame is optionally assigned a corresponding index number, unique for each frame, and this index number is stored in an indexing module 41 with an adjustable pointer that indicates which digital frame in the frame recording and storage module 39 corresponds to this index number. Optionally, the indexing module 41 allows specification of which portion of the digital frame is to be displayed (or downloaded through a download port 45, discussed below) and the format to be used for such display.

If information on one or more digital frames stored in the frame recording and storage module 39 is to be visually or audibly displayed (optional), the index number(s) corresponding to the digital frame(s) is specified at the indexing module 41. A copy of a specified digital frame, or portion thereof, is sent to a digital frame display or playback module 43, for viewing of the digitally expressed image(s) of the object O and/or of the corresponding position information in graphical or alphanumeric format. The format for display of the position information contained in a digital frame may be in terms of latitude, longitude, elevation, orientation angle (s), observation time and/or lens-to-object distance. Alternatively, the location coordinate information contained in a digital frame may be expressed in terms of local coordinates or in terms of another global coordinate system. Optionally, a visually perceptible map with an adjustable scale, drawn from a collection of maps stored in a map storage module 45, may be provided at the digital frame display module 43 that graphically indicates by an icon the position information of the apparatus 31 at the time a specified digital frame was formed.

The digital frame recorded and stored in the frame recording and storage module 39 can be viewed but cannot be edited, altered or deleted in either of the modules 39 or 43; this digital frame is "frozen" in the frame recording and storage module 39. The digital frame including the authentication information is never transmitted to another person or facility, except for downloading by an authorized downloader, and thus is not interceptible or vulnerable to deletion or alteration by a person or facility with an incentive to make such deletions or alterations. The chain of custody of the digital frame is preserved and is not compromised, through custody of the digital camera and its stored digital image.

Part or all of the information contained in a digital frame stored in the frame recording and storage module 39 may be downloaded, using a digital frame information download port 47 that is connected to the module 39 and that is controlled by a frame lock mechanism 49. The frame lock mechanism 49 prevents downloading of the digital frame information from the frame recording and storage module 39, or from the digital frame display 43, except by an authorized digital frame downloader who uses a special software key (e.g., a confidential or encryption key) or a special hardware key to request and implement the frame information download.

The digital image and the associated position information are downloaded directly from the digital frame recording and storage module 39, preferably using a portion of or all of the position information to provide a key for decryption and/or to provide a key for determining the pattern P of pixels used to hold the position information. Authentication of the image is provided by comparing the position information contained in the digital frame with the putative position information that is asserted or is on file elsewhere. If the downloaded or displayed position information and the putative position information substantially agree, the corresponding digital image on that frame may be authenticated. If the downloaded or displayed position information and the putative position information do not substantially agree, authentication of the corresponding digital image on that frame may be withheld.

The PDS/camera interface 35 may include an array of charge coupled devices ("CCDs"), magnetic tape recording or other suitable devices and media to digitally express the image(s). Various approaches for digital recording of an image in a digital still camera or in a digital video camera are discussed in U.S. Pat. No. 4,074,324, issued to Barrett, No. 4,131,919, issued to Lloyd et al, No. 4,489,351, issued to de Costemore d'Arc, No. 4,541,010, issued to Alston, No. 4,626,898, issued to Baba et al, No. 4,680,628 issued to Wojcik et al, No. 4,702,585, issued to Harada et al, No. 4,704,632, issued to Van Den Heuvel, and No. 4,837,628, issued to Sasaki. The information in these patents is incorporated by reference herein.

One method of "freezing" the digital frame uses a three-state, Read Only Memory (ROM) chip as part of the digital frame recording and storage module 39. The ROM chip has a plurality of activatable sites, each with an initial, pristine state and distinct, first and second activated or burned-in states. When a digital image is formed by the digital camera, the initial, pristine state at each site is converted into a first activated state or into a distinct second activated state, after which no further state change is possible. The digital frame thus formed may be further protected by locking down the frame so that the frame can, optionally, be viewed using the digital frame display 43 but cannot be downloaded except by use of a confidential key that is held by a certified digital image downloader. Alternatively, the confidential key may be decomposed into two or more key components, and each component may be held by a separate certified digital frame downloader.

Figure 8:
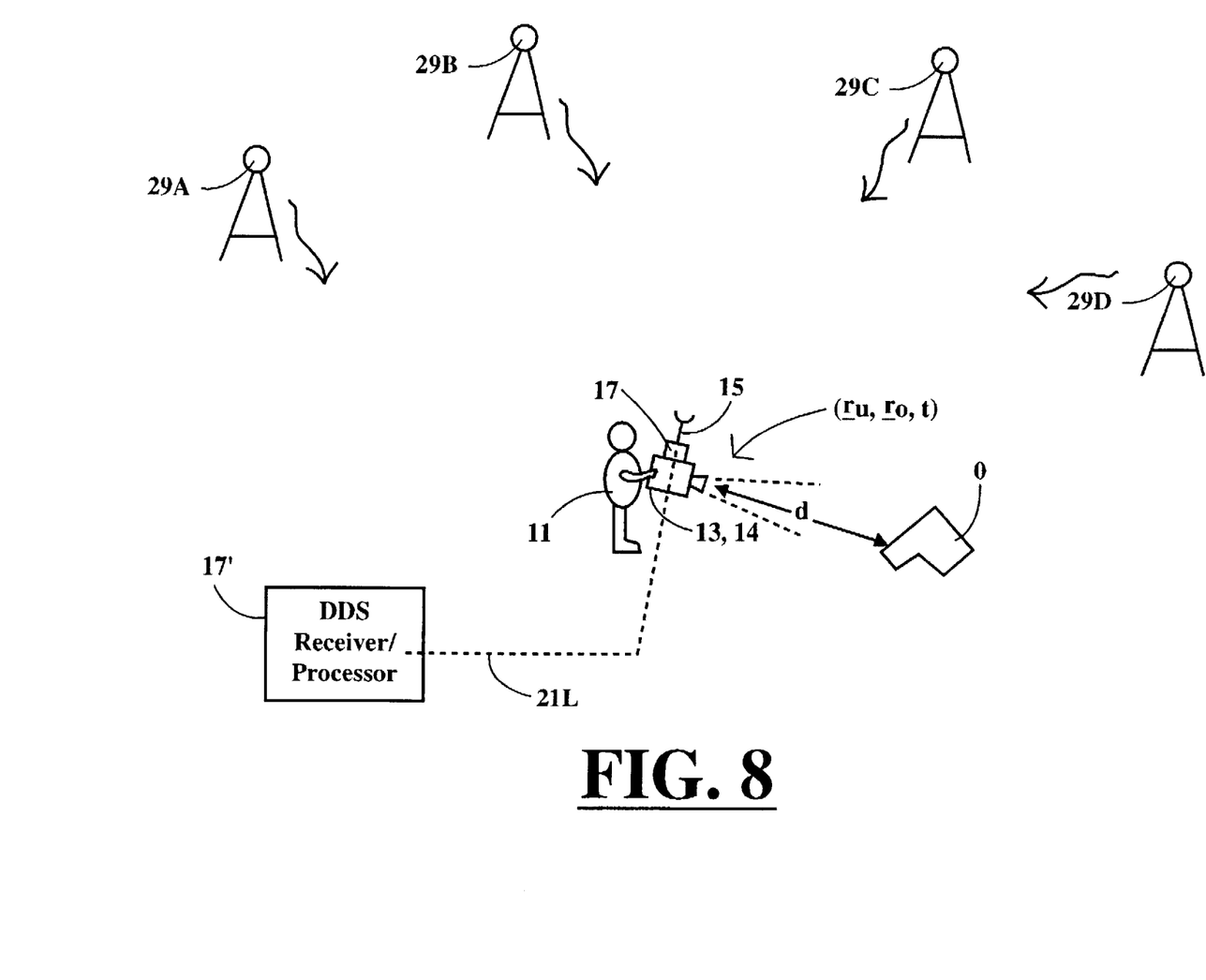

Alternatively, the PDS signal antenna assembly 15 and PDS signal receiver/processor 17 can receive PDS signals from ground-based PDS signal sources, such as signal towers or other substantially stationary sources 29A, 29B, 29C, 29D in a Loran-C, Tacan, Decca, Omega or Metricom system, as illustrated in FIG. 8.

We claim:

1. Apparatus for capturing and authenticating an image, the apparatus comprising:
    a digital image camera, having a lens that forms a digitally expressed image of a selected view;
    digital image recording and storage means for receiving the digitally expressed image from the camera and for storing this digitally expressed image as an array of pixel values, with each pixel value corresponding to a pixel in an array of pixels; and
    position determination means for determining position information, which includes at least one of the location of the camera, the angular orientation of the camera and the time at which the camera forms a digitally expressed image and for storing this position information as part of the digitally expressed image in the digital image recording and storage means, where the position information is stored as part of the digitally expressed image as an overlay on, or modification of, digital values representing pixel values for the digitally expressed image.

2. The apparatus of claim 1, wherein said position determination means is part of a Satellite Positioning System ("SATPS") that is drawn from a class of location determination systems consisting of the Global Positioning System, the Global Orbiting Navigational Satellite System, the Motorola Iridium System and the Low Earth Orbiting System.

3. The apparatus of claim 1, wherein said position information is stored by altering the pixel value information contained in a selected group of two or more pixels that are used to form said digitally expressed image.

4. The apparatus of claim 1, wherein said position determination means allows at least one of said location information, said angular orientation information and said time information to be read out in visually perceptible form.

5. The apparatus of claim 1, wherein said position determination means allows at least one of said location information, said angular orientation information and said time information to be read out in electronically perceptible form.

6. The apparatus of claim 1, further including rangefinder means for determining the distance from said digital image camera to a selected object in said selected view at the time said digitally expressed image is formed by said digital image camera and for including information on this distance in said position information.

7. The apparatus of claim 1, wherein said position determination means is part of a ground-based location determination system that is drawn from a class of location determination systems consisting of Loran, Tacan, Decca, Omega and Metricom.

8. The apparatus of claim 1, wherein said position determination means stores said position information in an encrypted format with a selected encryption key that is determined by reference to at least one of said location information, said angular orientation information and said time of image formation information.

9. The apparatus of claim 1, further comprising image authentication means for receiving a selected digitally expressed image and associated position information for the selected image from said digital image recording and storage means, for determining the associated position information for the selected image, for comparing the associated position information with authentic position information for the selected image, and for accepting the selected image as authentic only if the associated position information and the authentic position information substantially agree with each other.

10. The apparatus of claim 1, further comprising image authentication means for receiving position information associated with a selected digitally expressed image, for comparing the associated position information with authentic position information for the selected image, and for accepting the selected image as authentic only if the associated position information and the authentic position information substantially agree with each other.

11. The apparatus of claim 3, wherein each pixel in said selected group of pixels has at least one pixel bit value altered, relative to the pixel bit values used by this pixel to represent said digitally expressed image, to contain a portion of said position information that is to be stored.

12. The apparatus of claim 3, wherein the location of at least one of said selected group of two or more pixels is chosen using said position information.

13. The apparatus of claim 3, wherein said selected group of two or more pixels is chosen so that any pixel in a selected region of pixels that are part of said digitally expressed image is within a selected distance of at least one of said selected group of two or more pixels.

14. The apparatus of claim 13, further comprising digital image indexing means, connected to at least one of said digital image recording and storage means and said display means, for associating an indicium with at least one selected digital image stored in said recording and storage means and for causing said display means to display at least a portion of the selected digital image and the associated position information when this indicium is selected by said recording and storage means or said display means.

15. The apparatus of claim 13, further comprising a digital image lock, operatively associated with at least one of said digital image recording and storage means and said display means, that allows a digitally expressed image and its corresponding position information that is stored in said digital image recording and storage means to be displayed but does not permit deletion or alteration of any portion of the digitally expressed image or any portion of its corresponding position information within said digital image recording and storage means.

16. The apparatus of claim 15, wherein said digital image lock comprises at least one Read Only Memory (ROM) chip having a plurality of programmable sites, with each programmable site having an initial state when the site is unprogrammed and having a first activated state and a second activated state that is distinct from the first activated state, whereby formation of a digital image on a ROM chip causes each programmable site to enter a first activated state or a second activated state that cannot be subsequently altered.

17. Apparatus for capturing and authenticating an image, the apparatus comprising:

a digital image camera, having a lens that forms a digitally expressed image of a selected view;

digital image recording and storage means for receiving the digitally expressed image from the camera and for storing this digitally expressed image as an array of pixel values, with each pixel value corresponding to a pixel in an array of pixels;

position determination means for determining position information, which includes at least one of the location of the camera, the angular orientation of the camera and the time at which the camera forms a digitally expressed image and for storing this position information as part of the digitally expressed image in the digital image recording and storage means; and display means, connected to the digital image recording and storage means, for providing information contained in a digital frame in at least one of electronically perceptible form, visually perceptible form and audibly perceptible form, to allow authentication of, or withholding of authentication of, information contained in the digital frame, where the display means displays the digitally expressed image and displays at least a portion of the position information as an overlay on the digitally expressed image in visually perceptible form.

18. The apparatus of claim 17, wherein said display means provides said information contained in said digital frame in said visually perceptible form and provides an indicium that indicates at least a portion of said position information, associated with said digitally expressed image, that is stored.

19. The apparatus of claim 17, wherein said display means provides said information contained in said digital frame in said visually perceptible form with an adjustable scale for said visually perceptible form.

* * * * *